Figure 2:
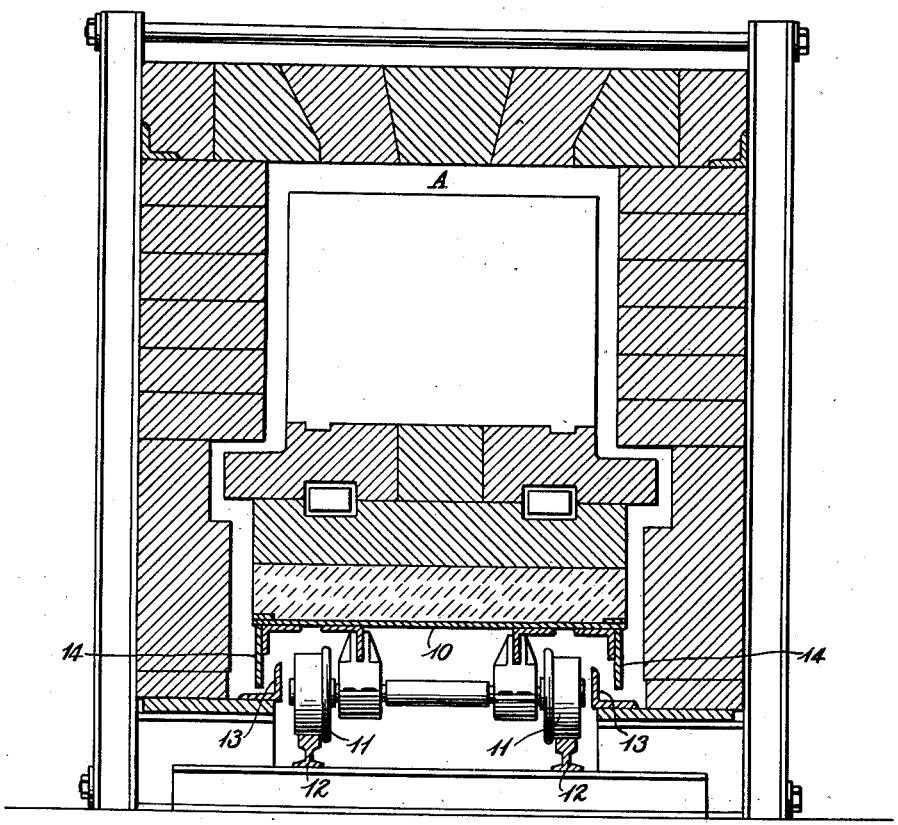

July 26, 1932.  K. M. SIMPSON  1,868,952
PRODUCTION OF SPONGE IRON
Filed June 30, 1930  2 Sheets-Sheet 1
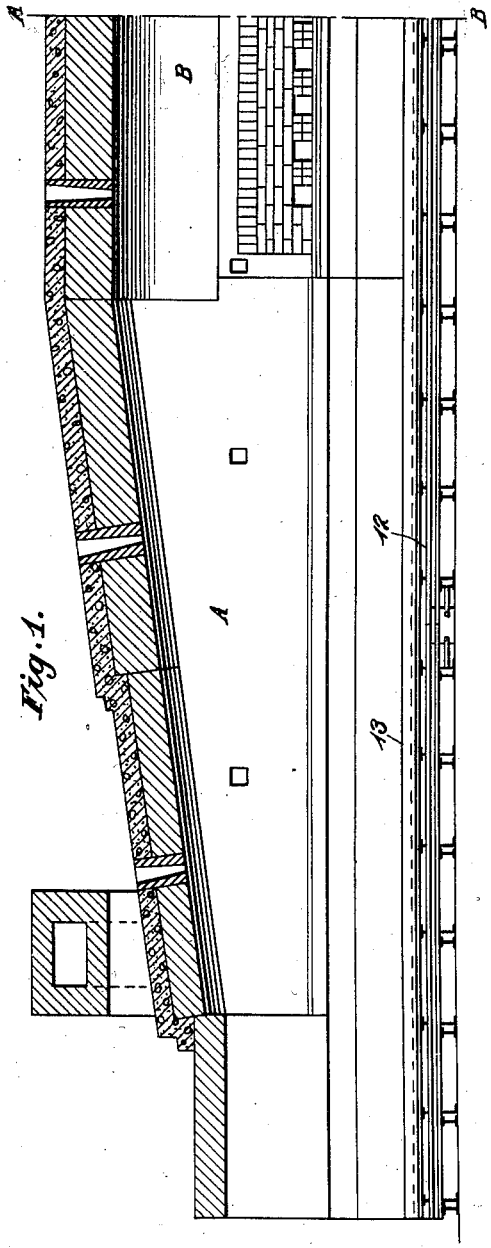
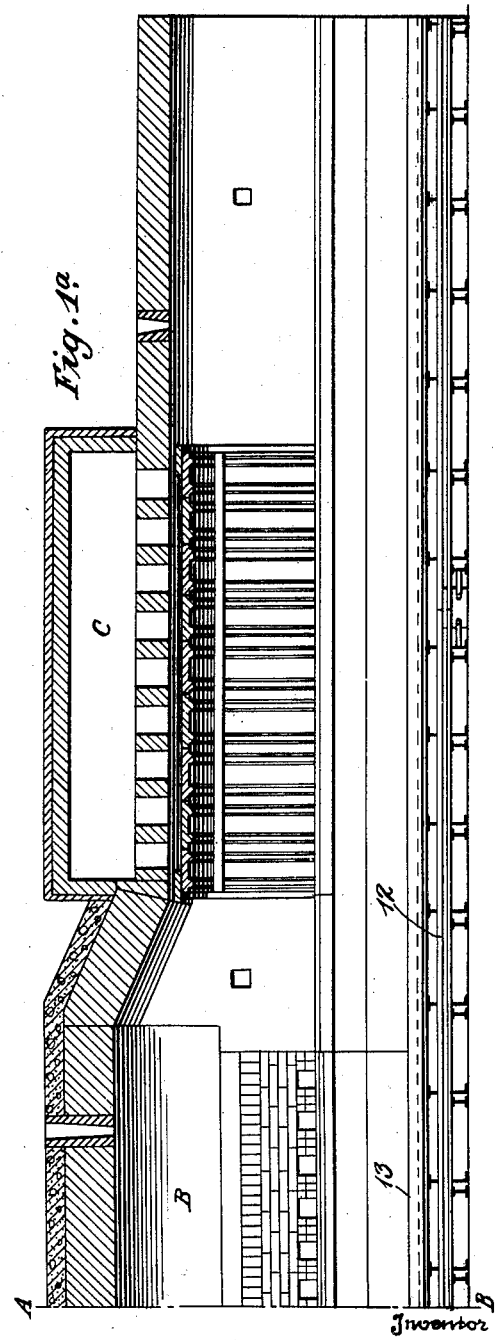
Inventor
Kenneth M. Simpson
By Bacon & Thomas
Attorneys July 26, 1932. K. M. SIMPSON 1,868,952
PRODUCTION OF SPONGE IRON
Filed June 30, 1930 2 Sheets-Sheet 2

Inventor
Kenneth M. Simpson

By Bacon & Thomas
Attorneys

Patented July 26, 1932

1,868,952

UNITED STATES PATENT OFFICE

KENNETH M. SIMPSON, OF NEW YORK, N. Y., ASSIGNOR TO INTERNATIONAL CHROMIUM PROCESS CORPORATION, OF NEW YORK, N. Y., A CORPORATION OF DELAWARE

PRODUCTION OF SPONGE IRON

Application filed June 30, 1930. Serial No. 465,036.

My invention relates to the production of sponge iron and pertains more particularly to the manufacture of iron sponge of a dense coherent character, the characteristics of which add considerably to the commercial utility of sponge iron.

In processes in use at the present time, according to which iron sponge is prepared, the product obtained is a bulky, highly porous, brittle material which is highly oxidizable in air, particularly at temperatures utilized in the processing of irons and very difficult to melt. Furthermore, the sponge iron product produced according to present methods is a non-self-sustaining mass very difficult to handle and store. Furthermore, it becomes necessary for the purpose of handling sponge iron to subject the same to briquetting operations which add considerably to the cost of manufacture. Even briquetted sponge iron, however, is subject to many of the disadvantages of the non-briquetted sponge, for example, it is very readily oxidizable, difficult to melt under the temperature conditions to which it is subjected, in the processes in which it is used, and disintegrates to a considerable extent at the temperatures employed. The briquettes of sponge iron are likewise bulky and difficult to handle.

One of the main features of my invention resides in the preparation of a sponge iron which is extremely dense and coherent, being self-sustaining under the conditions employed in a melting furnace, and is far less readily oxidizable than either the briquetted or the un-briquetted sponge. The sponge iron in my invention occupies considerably less volume for a given mass and is readily handled and stored. Furthermore, in accordance with my process, I eliminate the necessity for a subsequent briquetting operation as is necessary in the commercial processes now in operation.

A further feature of my invention resides in the manufacture of sponge iron by a direct reduction of iron ore, in which the reduced charge is maintained at a temperature sufficiently elevated to cause incipient fusion and partial coalescence of the reduced metal particles, the period to which the mass is subjected at this temperature being limited to the time necessary to produce incipient fusion without causing a general melting of the reduced metal.

My process also contemplates the use of a continuous process in the production of sponge iron by carrying out the smelting of the ore in a tunnel kiln. The use of a tunnel kiln is of particular advantage in the preparation of sponge iron of the type contemplated by my invention, in view of the accurate temperature control which may be effected in continuous tunnel kiln processes. In the tunnel kiln process contemplated by my invention for the production of sponge iron, the charge passes from the entrance of the kiln to a maximum temperature, sufficient to cause incipient fusion, and the charge is then progressively cooled before a general fusion of the reduced metal takes place, being withdrawn from the kiln after successive cooling, at a temperature which permits of easy handling of the reduced charge.

The tunnel kiln utilized in my process may be of the type generally described in my co-pending application, Serial No. 449,583; a tunnel kiln of this character is shown in the accompanying drawings.

Referring particularly to the drawings:

Figures 1 and 1a comprise a longitudinal elevation in section of my preferred form of kiln;

Figure 2 represents a transverse elevation in section of the kiln showing also one of the cars which is used in connection therewith.

The kiln may be considered generally as increasing in temperature successively from the entrance to the central portion where a maximum temperature is reached, and decreasing in temperature from the central portion to the exit of the kiln. For convenience, the kiln may be considered as being divided generally into an initial heating zone A, a central heating zone B, and a final heating zone C. It will be understood that the zones, A, B and C, have no definite limits but merge into each other, being considered as separate merely for the purpose of describing the operation of my process.

The ore to be reduced, together with the reducing agent, usually carbon in the form of coal or coke, is loaded upon cars 10 which are provided with hearths (not shown), the cars being provided with wheels 11 which run on rails 12, passing through the kiln as shown. A sand seal or equivalent means is maintained between the cars and the kiln walls by means of flanges 13 and 14. This seal retains the heat within the upper portion of the kiln, and enables the car wheels and rails to operate without interference from the high temperatures encountered in the kiln.

To describe in detail a preferred form of my invention:

The ore to be treated, together with a suitable reducing agent, usually coal, is loaded upon cars 10. The cars are provided with hearths having a width of about one foot, the length of about three feet, and the depth of about six inches. The charge which is placed in each of the cars is about 125 pounds in weight, 100 pounds being ore and from 20 to 25 pounds being coal, the charge being preferably ground to about 20 mesh size. Ordinarily, before loading the material to be used onto the tunnel kiln car, a layer of sand is first placed upon the bottom of the compartment. The cars are run into the kiln at one end and removed from the other end. As a car is removed from the exit end of the kiln, another car is introduced into the entrance end. The cars enter the kiln at room temperature and are successively moved forward about once every hour.

The temperature rises from room temperature, approximately 80° F., and the peak temperature in the hottest zone of the kiln to 2640° F., the cars being withdrawn from the kiln at approximately room temperature. It therefore requires about eight hours for the car to reach the hottest point in the kiln and the temperatures in the different positions of the cars of approximately 300° F. higher at the end of each hour period, and approximately the same amount lower as the car advances towards the exit end, the car advancing by its own length for every hour period. The temperature of the charge, as determined from the temperature at the surface thereof, is approximately 2750° F. The temperatures in the kiln are carefully observed and checked by means of a series of pyrometers.

The temperature of the charge in the maximum heating zone is usually just slightly above the fusing temperature of pure iron. In the example just given of an application of my process, the reduced metal contains approximately one-tenth percent carbon content, and the temperature at which the metal is maintained in the maximum heating zone is just slightly above the theoretical melting point of iron containing this percentage of carbon. It is found that a temperature of this magnitude is sufficient to cause an incipient fusion and that at this temperature the time of melting is very slow serving only to cause a partial fusion of the particles before the car is moved into a cooler zone.

The temperature at which the reduction of the iron ore starts is about 932° F., and it is probably completely reduced at a temperature of 1652° F. From this point to the maximum heating zone, the charge is being heated gradually so as to obtain uniform heating through the mass at a point at which incipient fusion starts. The charge is maintained in this zone sufficiently long to cause a suitable coalescence of the particles due to partial melting, the time period being maintained short enough to prevent the whole mass of reduced iron from fusing to a fluid state.

The final product withdrawn from the kiln is a coherent solid mass in which the iron particles are united through the mass giving a very strong self-sustaining product.

It is evident therefore from a consideration of the above full description of my process that I obtain a product which is vastly superior to any heretofore obtained by processes utilized in the manufacture of sponge iron. The preparation of this type of product is very satisfactorily effected by the use of a tunnel kiln in the manner described. As is well known, tunnel kilns are particularly designed for accurate temperature control. The temperature in the various zones of the tunnel kiln and particularly in the hottest zone, can be held to within very narrow limits and can be maintained practically constant. This results not only in the accurate control of the character of product desired but also results in a very desirable fuel economy.

My invention is susceptible of many changes, and I do not desire to limit the invention to the specific proportions and temperatures herein described, except insofar as they are necessary for the purposes of the invention.

I claim as my invention:

1. A process for the production of a dense, coherent sponge iron wherein a charge of iron ore and reducing agent in a finely divided state is introduced into an initial heating zone in which the ore is subjected to reduction conditions, introducing the ore so reduced into a second heating zone in which the reduced ore is subjected to a temperature sufficient to cause incipient fusion of the metal, for a period of time such that a coalescence of the individual reduced metallic particles will result, the period being insufficient to cause a general fusion of the reduced metal.

2. A process for the production of a dense, coherent sponge iron, wherein a charge of iron ore and reducing agent in a finely divided state is introduced into an initial heating zone under conditions such that reduction is substantially completed within this zone, withdrawing the reduced charge to a zone having a temperature sufficient to cause incipient fusion of the reduced particles, and withdrawing the charge from said second zone to a cooling zone prior to complete fusion of the charge.

3. A process for the production of a dense, coherent sponge iron, wherein a charge of iron ore and reducing agent in a finely divided state, is introduced into an initial heating zone, the charge being subjected in said initial heating zone to reducing conditions, being subjected to an increasing temperature until the reduction is substantially completed, introducing the reduced charge into a second heating zone in which the maximum temperature is sufficient to effect a partial fusion of the reduced metal particles, maintaining the charge at such temperature for a period of time sufficient to cause coalescence of the metallic particles, withdrawing the charge to a cooling zone before the charge has reached the state of general fusion, and cooling the charge progressively in said cooling zone.

4. A process for the production of a dense, coherent sponge iron, wherein a charge of iron ore and carbonaceous reducing agent in a finely divided state is introduced to an initial heating zone, the charge being progressively passed through said zone under increasing temperature conditions, until it is completely reduced, introducing the charge into a second heating zone the maximum temperature of which is only slightly above that of the fusion point of reduced iron, maintaining the charge at this temperature for a period of time sufficient to cause coalescence of the reduced metallic particles, withdrawing the charge from said second heating zone into a cooling zone before the charge has become completely fused, and successively cooling the charge in said cooling zone.

5. The process for the preparation of sponge iron of a dense coherent self-supporting nature in which the metallic particles are bonded together by partial fusion which comprises successively passing a plurality of individual charges of finely divided ore and reducing agent through a longitudinal kiln, maintaining a maximum temperature within the kiln which is above the fusion point of the reduced iron, progressively advancing the charges toward said maximum temperature in a manner to substantially reduce the ore by the time said temperature is reached, and subjecting the individual charges to the maximum temperature within the kiln for a period sufficiently long to cause partial fusion and coalescence of the reduced metal particles, but too short to permit complete fusion of the metal.

6. A process for producing sponge iron which comprises introducing a charge of iron ore and reducing agent to an elongated kiln, maintaining at an intermediate portion of the kiln a maximum temperature which is above the fusion point of the reduced iron, gradually advancing the charge toward said intermediate portion of the kiln, the ore being substantially reduced by the time the charge arrives at said intermediate portion, maintaining the charge in said intermediate portion of the kiln for a time period adequate to cause partial fusion and coalescence of the reduced iron, withdrawing the charge from said intermediate portion before complete fusion of the iron has taken place, gradually advancing the charge through the remaining portion of the kiln while progressively lowering the temperature thereof, and then removing the charge from the kiln.

In testimony whereof I affix my signature.

KENNETH M. SIMPSON.